United States Patent Office 3,779,998
Patented Dec. 18, 1973

3,779,998
PROCESS FOR THE POLYMERIZATION
OF LACTAMS
Karl-Heinz Hermann, Krefeld-Bockum, Germany, assignor to Bayer Aktiengesellschaft, Leverkusen, Germany
No Drawing. Filed July 2, 1971, Ser. No. 159,499
Claims priority, application Germany, July 4, 1970,
P 20 33 265.4
Int. Cl. C08g 20/10
U.S. Cl. 260—78 L    9 Claims

ABSTRACT OF THE DISCLOSURE

A process for the polymerization of a lactam having at least 7 ring members in the presence of a catalytic quantity of an inorganic or organic oxy acid of phosphorus wherein the catalyst is added to the monomeric lactam melt of at least 200° C. under rapid stirring and the catalyst-containing lactam melt is subsequently heated to a polymerization temperature of from 280 to 340° C.

---

This invention relates to a process for the polymerization of lactams, especially of lactams having at least 7 ring members, in the presence of a catalytic quantity of a strong acid at a temperature above 200° C.

It is already known that lactams, especially lactams having more than 8 ring members, such as ω-dodecalactam, can be polymerized in the presence of catalytic quantities of strong acids at elevated temperature. Oxy acids of phosphorus, such as orthophosphoric, metaphosphoric and pyrophosphoric acid, phosphorous acid and organic phosphonic acids, are particularly suitable catalysts. These catalysts can be added either to the solid monomeric lactam at room temperature or to a melt of the monomeric lactam at a temperature just above the melting point. The mixture is then heated to the polymerization temperature and polymerization is carried out in known manner.

When this process is carried out in batches, for example in autoclaves, it has been found that, despite of uniform polymerization conditions, such as the quantities in which the catalyst and chain terminator are used, polymerization temperature and polymerization time, the melt viscosity of the polymers obtained varies considerably from batch to batch. These fluctuations in melt viscosity cause considerable difficulties during the processing of the products, for example during the production of films or fibres.

It has now been found that polymers having a reduced melt viscosity, which remains the same from batch to batch, can be obtained in the batch polymerization of lactams, especially of lactams having at least 7 ring members, at elevated temperature in the presence of a catalytic quantity of a strong acid, especially an organic or inorganic oxy acid of phosphorus, if the catalyst is only added to the monomeric lactam having at least a temperature of 200° C. preferably of 240° C. accompanied by simultaneous rapid homogeneous admixture.

Accordingly, the present invention relates to a process for the polymerization of a lactam or a mixture of lactams having at least 7 ring members in the presence of a catalytic quantity of a strong acid, wherein the catalyst is added to the monomeric lactam melt at a temperature of at least 200° C. under rapid stirring and the catalyst-containing lactam melt, homogeneously admixed with the catalyst is subsequently heated to a polymerization temperature of from 250 to 340° C.

For example, ω-dodecalactam can be polymerized according to the process by heating the ω-dodecalactam, optionally containing additives such as chain terminators, to a temperature of at least 200° C., preferably to a temperature of at least 240° C. in an autoclave. Only after this minimum temperature has been reached the catalyst is added to the lactam melt and mixed homogeneously with the lactam melt as quickly as possible. The catalyst-containing lactam melt is then further heated up to the polymerization temperature of 250 to 340° C., preferably 270 to 320° C.

Examples of suitable catalysts include orthophosphoric, metaphosphoric and pyrophosphoric acid, phosphorous acid, hypophosphorous acid and organic oxy acids of phorphorus corresponding to the formula

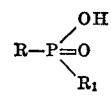

in which

R represents an aliphatic, cycloaliphatic, araliphatic, alkyl substituted aromatic or aromatic hydrocarbon radical such as methyl-, ethyl-, propyl-, butyl-, cyclohexyl-, benzyl-, 1-phenylethyl-, phenyl-, toluyl-, $R_1$ represents a hydrogen atom, a hydroxy group or an aliphatic, cycloaliphatic, araliphatic, alkyl substituted aromatic or aromatic hydrocarbon radical such as methyl-, ethyl-, propyl-, butyl-, cyclohexyl-, benzyl-, 1-phenylethyl-, phenyl-, toluyl.

It is preferred to use orthophosphoric, phosphorous mono- or dimethyl-, mono- or diethyl-, mono- or di-n-propyl-, mono- di-n-butyl-, mono- or diclyclohexyl-, mono- or dibenzyl-, mono- or diphenyl-, mono- or di-p-chlorophenyl phosphoric acid.

The catalyst is used essential in a quantity of from 0.001 to 1.0 mol percent, preferably in a quantity of from 0.01 to 0.5 mol percent (based on monomeric lactam). The catalyst can be added to the monomeric lactam, either in pure form or in the form of a solution in a suitable solvent, for example water.

Examples of lactams that can be polymerized by the process according to the invention include ε-caprolactam, caprylic lactam, oenanthic lactam and, in a preferred embodiment, ω-dodecalactam.

It is also possible to polymerize mixtures of different lactams, for example mixtures comprising 0.1 to 99.9% by weight of ω-dodecalactam and 99.9 to 0.1% by weight of ε-caprolactam, by the process according to the invention. If conventional chain terminators, in quantities of from 0.01 to 10% by weight, for example carboxylic acids such as acetic acid, propionic acid, stearic acid, benzoic acid or adipic acid, amines such as stearyl amine, of carbonamides such as N-butyl benzamide or N-butyl acetamide, are used during polymerization of the lactams, they can be added to the monomeric lactam before the addition of the catalyst together with the catalyst or after the addition of the catalyst. In addition, further additives of the usual kind, for example dyes, pigments, fillers, light stabilizers and heat stabilizers, weather stabilizers, optical brighteners, plasticizers and crystallization promoters can be added to the lactams before or after polymerization.

The polyamides produced in accordance with the invention are distinguished by a relatively narrow molecular weight distribution, relatively low melt viscosity, improved fluidity during processing and by relatively small fluctations in their melt viscosities from batch to batch. They are suitable for the production of injection-mouldings and, more particularly, for the production of such shaped articles as filaments, films or tubes by extrusion or melt-spinning.

EXAMPLE 1000 kg. of solid ω-dodecalactam are introduced together with 11 kg. of stearic acid as chain terminator into a heatable melting vessel. In order to remove oxygen, the melting vessel is repeatedly evacuated, and each time the vacuum created is broken again by introducing nitrogen. The melting vessel is then heated to approximately 190° C. and the ω-dodecalactam is fused. On completion of fusion, the melt which has a temperature of approximately 160° C. is introduced into an autoclave equipped with stirring mechanism and diphenyl heating, and further heated while stirring. After about 90 minutes, the lactam melt has reached a temperature of 260° C. 620 g. of an aqueous solution containing 85% by weight orthophosphoric acid (0.105 mol percent, based on ω-dodecalactam) are then added, care being taken to prevent atmospheric oxygen from entering the autoclave. After another 40 minutes, the polymerization temperature of 295° C. is reached. The melt is then kept at 295° C. for 14 hours, after which it is spun in the form of a wire approximately 3 mm. in diameter into a tank of water. The wires are granulated and finally, the granulate is dried.

The dry end product is tested in order to determine its relative viscosity (1% by weight solution in m-cresol at 25° C.) its melt viscosity at 250° C. and its content of low molecular weight fractions which can be extracted with methanol.

The measurements obtained from 10 batches produced by the process according to the invention are shown in the following Table 1:

TABLE 1

| Batch No. | Relative viscosity | Melt viscosity (poises) | Extract content (percent by weight) |
|---|---|---|---|
| 1 | 3.02 | 10,100 | 2.0 |
| 2 | 3.05 | 13,500 | 2.8 |
| 3 | 3.05 | 13,500 | 2.0 |
| 4 | 3.00 | 10,200 | 1.9 |
| 5 | 3.06 | 12,800 | 2.1 |
| 6 | 3.01 | 11,000 | 1.7 |
| 7 | 2.99 | 10,100 | 2.2 |
| 8 | 3.06 | 13,900 | 2.0 |
| 9 | 3.05 | 12,400 | 1.8 |
| 10 | 3.07 | 13,400 | 1.9 |

By way of comparison, Table 2 shows the measurement obtained from 10 batches in which the aqueous solution containing 85% by weight orthophosphoric acid was added before fusion to the ω-dodecalactam which, in other respects, was treated in the same way as described above.

TABLE 2

| Batch No. | Relative viscosity | Melt viscosity (poises) | Extract content (percent by weight) |
|---|---|---|---|
| 11 | 2.98 | 14,500 | 1.9 |
| 12 | 3.03 | 30,500 | 2.1 |
| 13 | 3.07 | 11,000 | 2.0 |
| 14 | 3.03 | 40,000 | 2.0 |
| 15 | 3.07 | 56,000 | 1.8 |
| 16 | 3.03 | 48,000 | 1.9 |
| 17 | 2.99 | 39,000 | 1.9 |
| 18 | 3.00 | 63,000 | 2.1 |
| 19 | 3.04 | 71,000 | 2.1 |
| 20 | 2.96 | 11,900 | 1.9 |

I claim:

1. A process for producing polyamides having a small fluctuation in their melt viscosities from batch to batch by the polymerization of a lactam or a mixture of lactams having at least 7 ring members in the presence of a catalytic quantity of an oxy acid of phosphorus, wherein the catalyst is added to an already melted monomeric lactam at a temperature of at least 200° C. but below polymerization temperature, under rapid stirring, and the resultant catalyst-containing lactam melt homogeneously admixed with the catalyst is subsequently heated to a polymerization temperature of from 250 to 340° C.

2. A process as claimed in claim 1, wherein the catalyst is added at a temperature above 240° C.

3. A process as claimed in claim 2, wherein polymerization is carried out at a temperature of from 270 to 320° C.

4. A process as claimed in claim 1, wherein the catalyst is ortho-, meta- or pyrophosphoric acid.

5. A process as claimed in claim 1, wherein the catalyst is an organic oxy acid of phosphorus corresponding to the formula

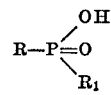

in which R represents an aliphatic, cycloaliphatic, araliphatic, alkyl substituted aromatic or aromatic hydrocarbon radical, and $R_1$ represents H, OH or an aliphatic, cycloaliphatic, araliphatic, alkyl substituted aromatic or aromatic hydrocarbon radical.

6. A process as claimed in claim 1 wherein the catalyst is mono- or dimethylyl-, mono- or diethylyl-, mono- or di-n-propylyl-, mono- or di-n-butyl-, mono- or dicyclohexyl-, mono- or dibenzyl-, mono- or diphenyl-, mono- or di-p-chlorophenylphosphoric acid.

7. A process as claimed in claim 1, wherein the catalyst used is added in quantities of from 0.001 to 1.0 mol percent based on the monomeric lactam.

8. A process as claimed in claim 1, wherein the lactam is ε-caprolactam, caprylic lactam, oenanthic lactam, ω-dodecalactam or a mixture of said lactams.

9. A process as claimed in claim 1, wherein the lactam is ω-dodecalactam.

References Cited

UNITED STATES PATENTS

| 3,564,599 | 2/1971 | Schaaf et al. | 260—78 L |
| 3,321,447 | 5/1967 | Kunde et al. | 260—78 L |
| 3,410,832 | 11/1968 | Griehl et al. | 260—78 L |
| 3,583,951 | 6/1971 | McGrath | 260—78 L |
| 3,607,971 | 9/1971 | McGrath. | |

WILLIAM H. SHORT, Primary Examiner

L. M. PHYNES, Assistant Examiner